United States Patent [19]

Sims

[11] Patent Number: 5,564,327

[45] Date of Patent: Oct. 15, 1996

[54] PISTON/PISTON ROD ASSEMBLY

[76] Inventor: James O. Sims, 1100 Brooks St., Decatur, Ala. 35601

[21] Appl. No.: 872,041

[22] Filed: Apr. 22, 1992

[51] Int. Cl.$^6$ .................................. F16J 1/00; G05G 1/00
[52] U.S. Cl. ........................... 92/172; 92/255; 74/579 R; 74/579 E
[58] Field of Search ........................... 92/242, 243, 172, 92/240, 249, 253, 128, 255, 171.1; 384/42, 29, 32, 281, 152, 16; 277/205, 188 A, 222, 168; 74/579 R, 579 E

[56] References Cited

U.S. PATENT DOCUMENTS

| | | | |
|---|---|---|---|
| 2,042,078 | 5/1936 | Suhm et al. | 74/579 R |
| 2,423,009 | 6/1947 | Defoe | 92/128 |
| 2,470,540 | 5/1949 | Young | 384/29 |
| 2,648,573 | 8/1953 | Wheildon, Jr. | 384/42 |
| 3,519,280 | 7/1970 | Genz | 277/205 |
| 3,559,540 | 2/1971 | Sheldon | 277/205 X |
| 3,637,269 | 1/1972 | Lantry | 384/281 |
| 4,928,577 | 5/1990 | Stoll | 384/32 X |
| 5,052,278 | 10/1991 | Smillie, III et al. | 384/32 X |

FOREIGN PATENT DOCUMENTS

| | | | |
|---|---|---|---|
| 803098 | 9/1936 | France | 277/222 |
| 1212514 | 3/1960 | France | 277/222 |
| 50401 | 8/1920 | Sweden | 74/579 R |
| 24461 | of 1909 | United Kingdom | 74/579 R |
| 278528 | 10/1927 | United Kingdom | 74/579 R |

*Primary Examiner*—John E. Ryznic
*Attorney, Agent, or Firm*—C. A. Phillips

[57] ABSTRACT

A piston/piston rod assembly wherein a piston is secured to a piston rod, and a sleeve (shell) is secured around the piston rod at predetermined locations along the length of the piston rod. The shell may be removably mounted and made of a harder, heavier material than the piston rod. Segmental sealing rings are provided around the periphery of the piston.

17 Claims, 5 Drawing Sheets

PISTON/PISTON ROD ASSEMBLY

FIELD OF THE INVENTION

The present invention relates generally to a piston/piston rod assembly and more particularly to such an assembly having a tough, durable, wear member in the form of an outer shell secured around the piston rod body along the surface portion thereof which reciprocates through end caps of a fluid actuator.

BACKGROUND OF THE INVENTION

Typically, piston rods tend to wear along that portion of the rod which extends (reciprocates) through the rod opening in the end caps of a fluid actuator. Such wear is the result of frictional engagement between the rod surface and the peripheral surface of the rod opening in the end cap and generally results in leakage of actuator fluid around the worn surface. To stop the leakage, the system in which the actuator is used is shut down, and the actuator is removed so that the entire piston and piston rod assembly can be replaced; however, some typical fluid actuators are very heavy and difficult to handle during installation in a fluid system or removal from a fluid system because of the extreme bulk. The body of the actuators are generally made of heavy cast metal, and adding to this weight is the weight of the piston and piston rod assembly. In some instances, a piston rod of 20 feet or more may be required. It is necessary that the piston rod have a very hard outer surface along the portion which reciprocates through the opening of the end cap of the actuator assembly to prevent excessive wear to the surface of the piston rod. The entire rod is typically made of a single durable material so that excessive wear does not affect the durability of the rod. However, such material is very heavy and adds to the weight problem as discussed above.

The present invention overcomes such noted difficulties by providing a rod having a tough durable outer shell member along the portion which reciprocates through the end caps of the fluid actuator assembly. Preferably, the rod body is made of lighter weight material by volume (per cubic inch) than the outer shell material, i.e., the density of the rod is less than that of the outer shell, and the outer shell member is made removable and is made of a hardened material to prevent excessive wear thereto as a result of its reciprocal movement through the end cap of the actuator. If the outer surface becomes pitted or worn, only the outer casing need be replaced, thus eliminating the need to replace the entire piston rod.

DESCRIPTION OF THE PREFERRED EMBODIMENT

Figure 1:
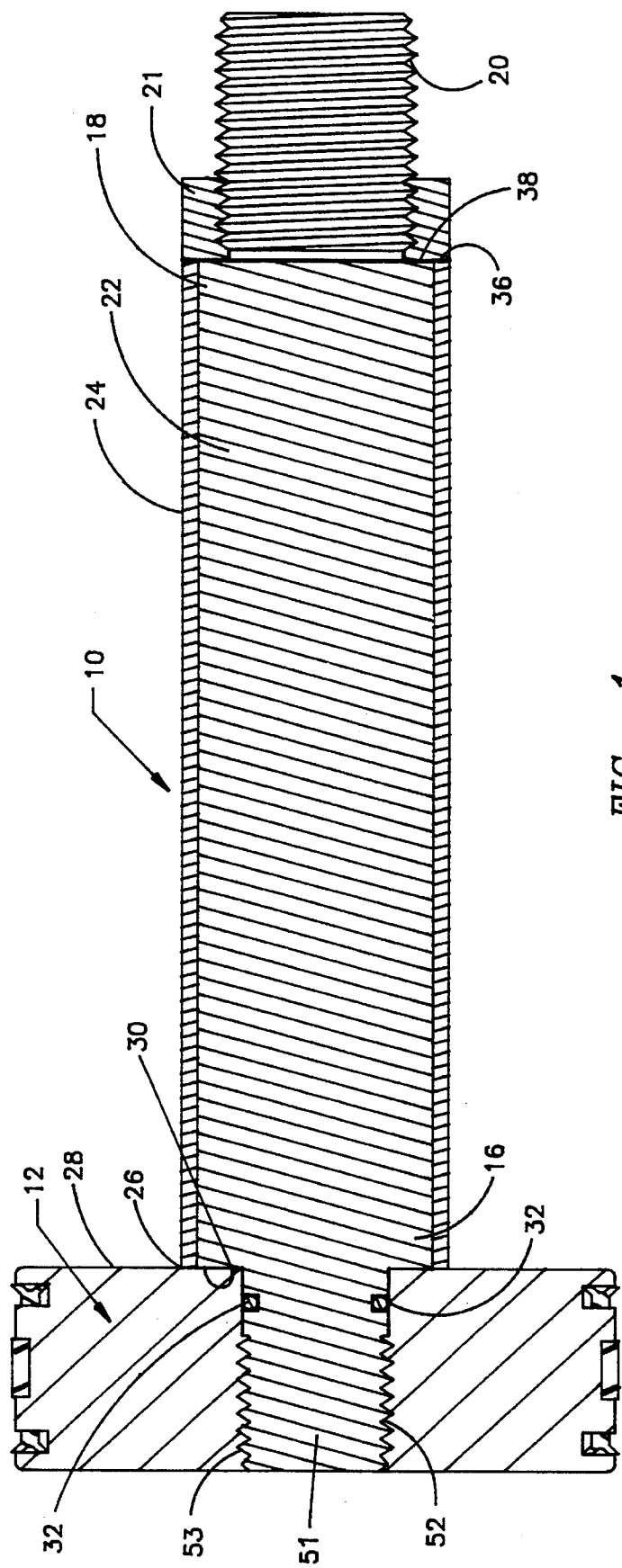
FIG. 1 is a cross-sectional elevational view of a piston rod having a removable outer surface (such as a shell or skin) extending substantially along the length of the rod.

As seen in FIG. 1, a piston/rod assembly 10 includes a piston 12 and a rod 14. Rod 14 includes opposite ends 16 and 18, and piston 12 is secured to end 16 of rod 14. End 18 of rod 14 is provided with an extending externally threaded portion 20 to receive a nut 21 thereon. Piston rod 14 includes a body 22 and an outer shell 24 of hardened, durable material. Body 22 is preferably lighter in weight (per cubic inch) than outer shell member 24. Shell 24 may be made removable as discussed hereinbelow. As seen in FIG. 1, the outer shell 24 has one end 26 which abuts against a face surface 28 of piston 12, and body 22 has a shoulder 30 which also abuts against piston surface 28. An O-ring seal 32 is provided between the piston and an extending end section 34 of body 22. To removably secure the outer shell 24 to body 22, nut member 21 is threaded on threaded extending portion 20 of rod body 22 until it abuts against the end 36 of outer shell 24 and against a shoulder 38 provided on end 18 of body 22.

Figure 2:
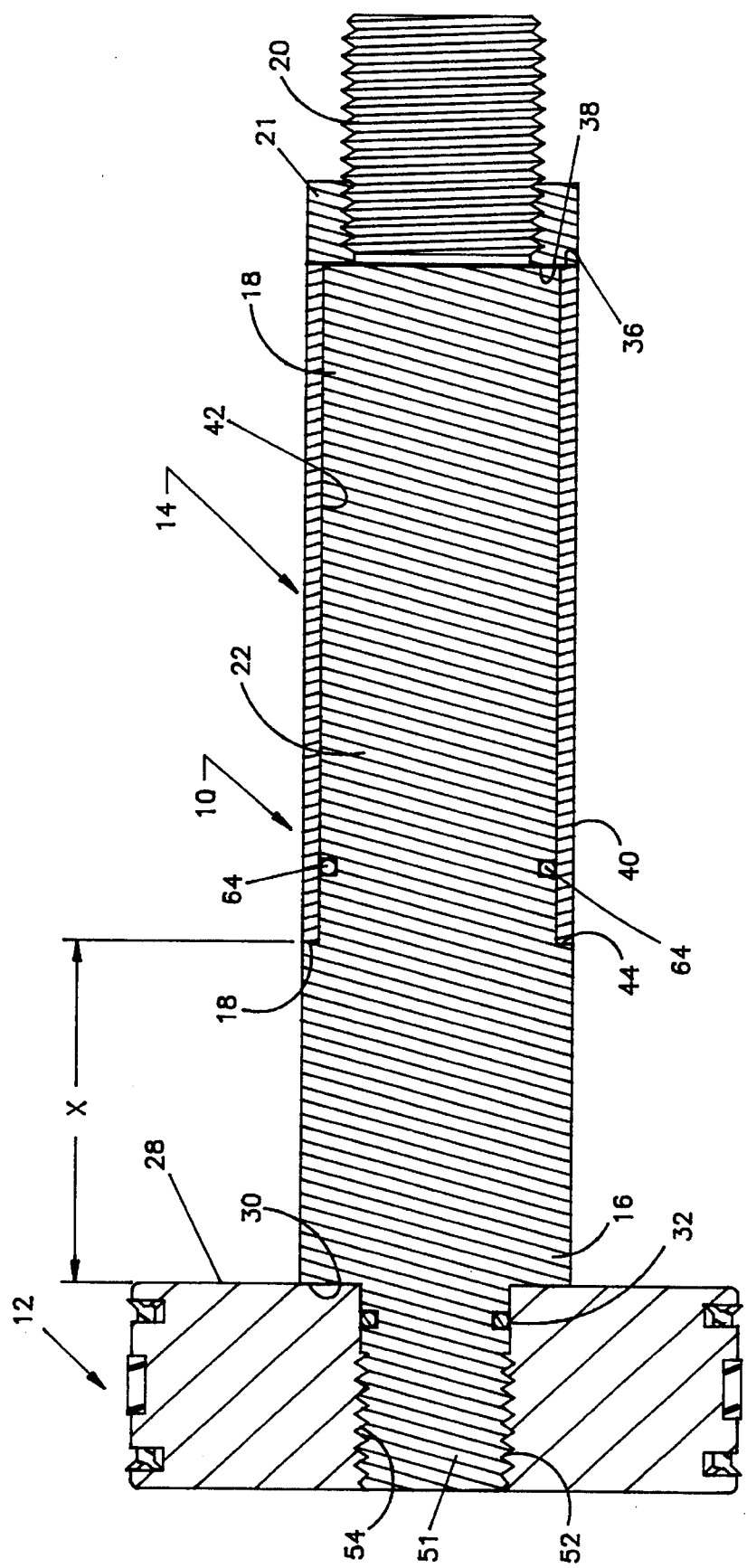
FIG. 2 is a view similar to FIG. 1 wherein the removable outer shell or skin is spaced from the piston end and covers only a portion of the length of the rod.

FIG. 2 illustrates another embodiment of the present invention wherein like numerals refer to like parts. As seen in FIG. 2, the body 22 is only partially encompassed by an outer shell 40 which does not extend the entire length of the piston rod body 22.

Figure 4:
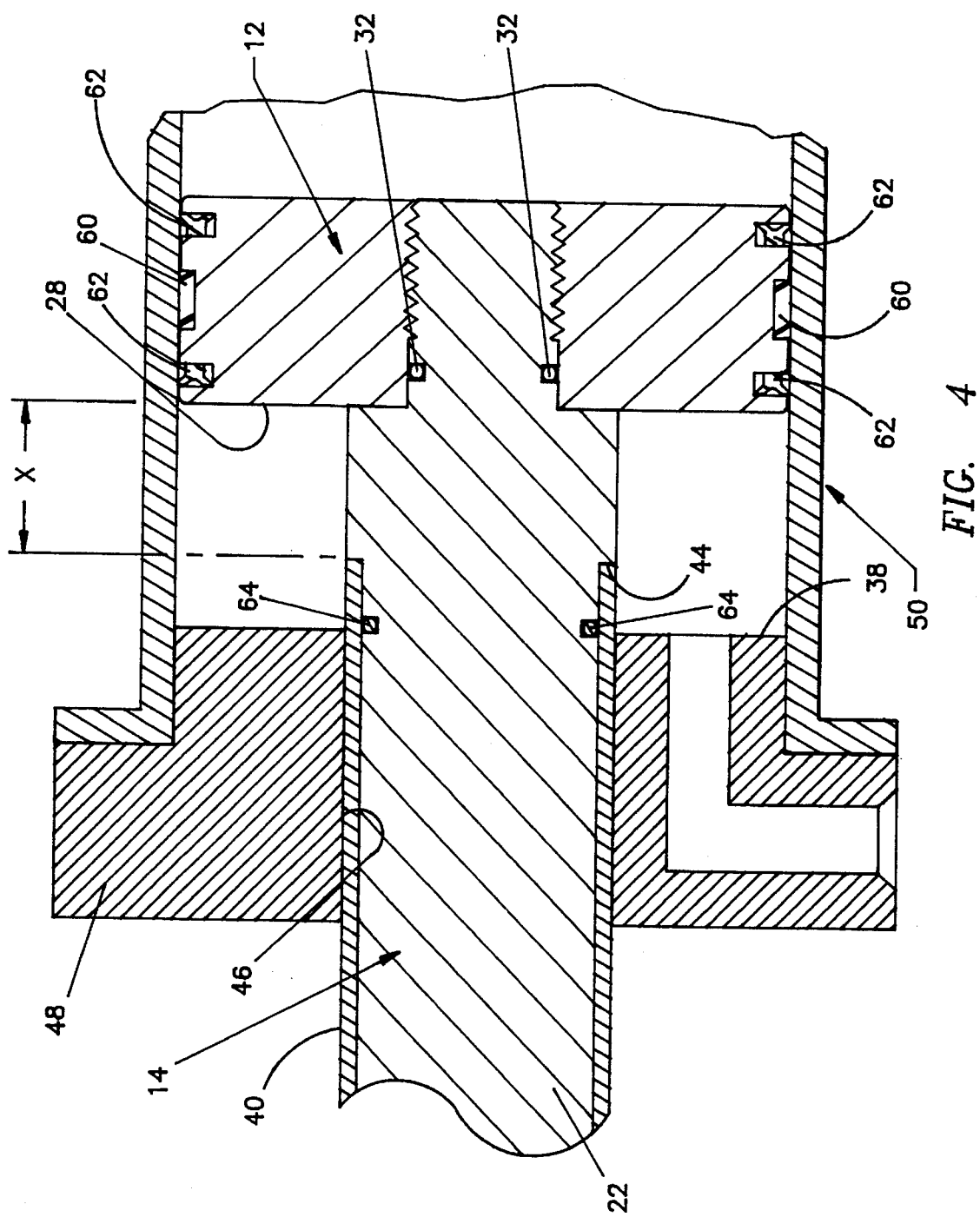
FIG. 4 is a partial sectional view of an actuator having the piston/rod assembly of FIG. 2 therein in accordance with the principles of the present invention therein.

In this embodiment, the body 22 is provided with a recessed portion 42 configured to form an annular shoulder 44 a distance "X" from the face surface 28 of piston 12. This distance "X" is determined by the length of the stroke of the piston as illustrated in FIG. 4 wherein the piston is shown to be at the end of its stroke. As can be seen in FIG. 2, the outer shell extends from shoulder 44 to shoulder 38 and is secured in recessed portion 42 on the rod body by nut 21. Shell 40 covers the portion of the piston rod body which extends through opening 46 in end cap 48 of a cylinder 50 (FIG. 4). By providing a durable outer shell which does not require the amount of shell material as is needed in the embodiment of FIG. 1, yet greater weight savings are achieved at less cost.

Figure 3:
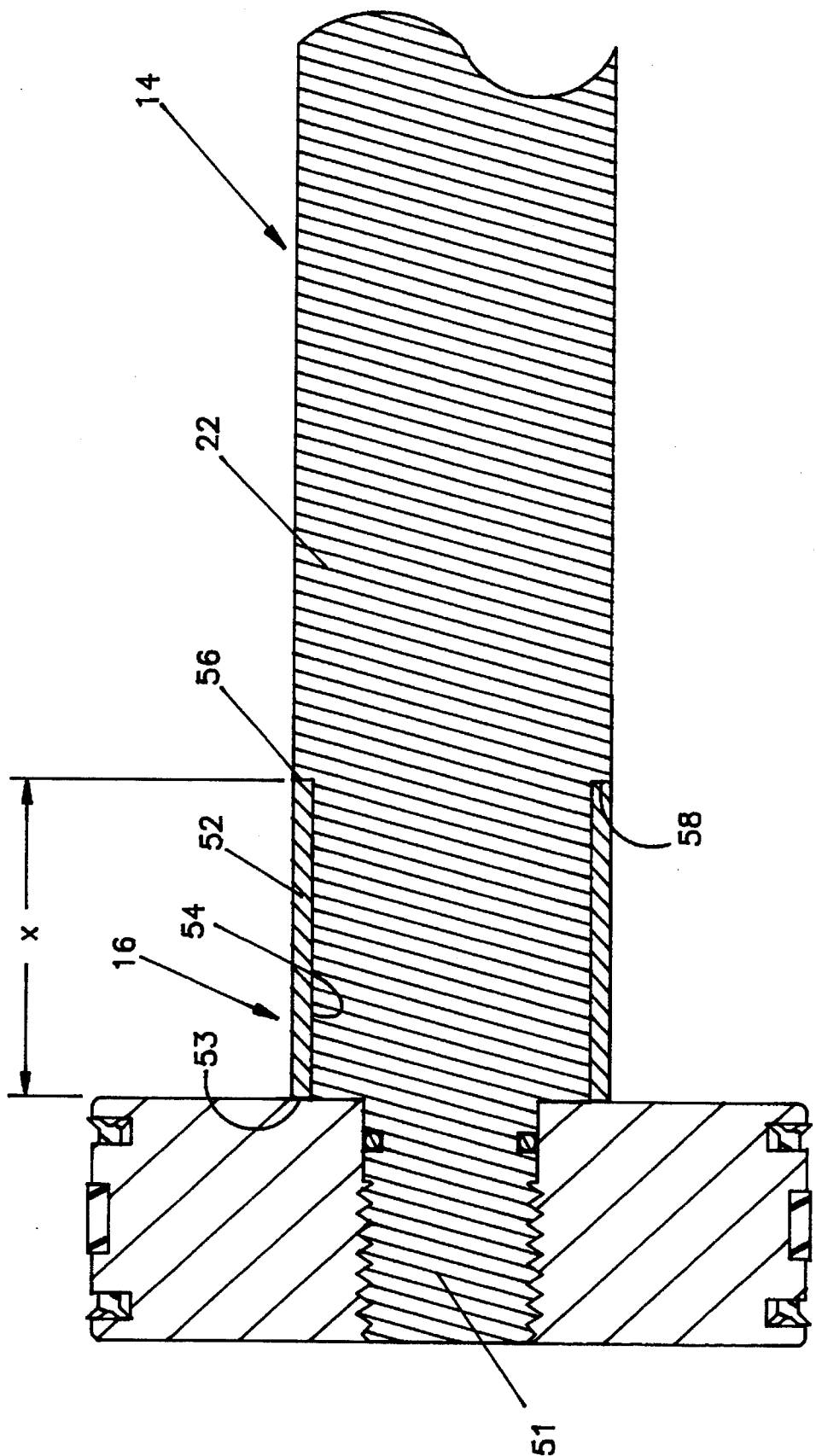
FIG. 3 is a view similar to FIG. 1 wherein the removable outer shell or skin abuts against the piston face surface and covers a forward portion of the length of the rod.

FIG. 3 illustrates another embodiment of the present invention wherein like numerals refer to like parts. As seen in FIG. 3, the body 22 of the rod is only partially encompassed by an outer shell 52 at the forward end 16 thereof. In this embodiment, outer shell 52 is provided in an annular recessed portion 54 at the forward end portion 16 of body 22. Shell 52 includes ends 53 and 56, and end 53 is disposed in abutting relation with surface 28 of piston 12. End 56 is disposed in abutting relation with a shoulder 58 provided at the juncture of recessed portion 52 and the larger diameter of rod body 22. In this embodiment, threaded end 20 and nut 21 (as shown in FIGS. 1 and 2) are eliminated since the piston 12 is threaded onto the extending portion 51 to receive the piston in threaded relation on rod 22, with shell 52 being held between shoulder 58 and surface 28 of piston 12. Shoulder 58 is positioned a predetermined distance "X" from the surface 28 of piston face 28. The distance "X" is dependent upon the length of the stroke of the piston as discussed supra, and in this instance, is the portion of the rod which moves through the opening in the end cap of the actuator assembly during reciprocal movement of the piston.

As can be seen in FIG. 1, the outer surface of the shell is provided with a constant diameter throughout its entire length. Also, as seen in FIG. 2, the outer surface of the shell and the exposed portion (that portion not covered by the shell) of the rod are provided with a constant diameter along the portion of the assembly which extends between the reduced diameter portions 20 and of the rod. In FIG. 3, the diameter of the outer surface of the rod and shell are equal.

It is to be understood that the piston may be made as an integral part of the rod body or may be made to be removable from the rod body. To provide for the piston to be removable, end 16 of body 22 is provided with an extending portion 51 having external threads 52 for threadably engaged relation with internal threads 53 of piston 12.

Figure 5:
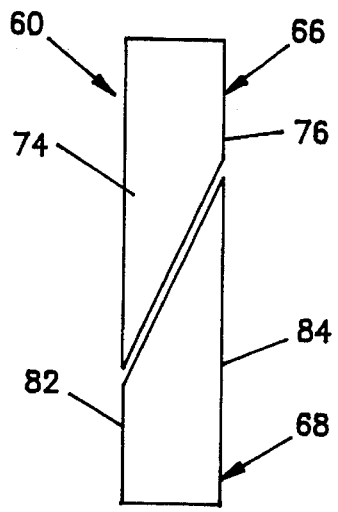
FIG. 5 is a side elevational view of a segmental wear ring as provided on the piston of the present invention.
Figure 6:
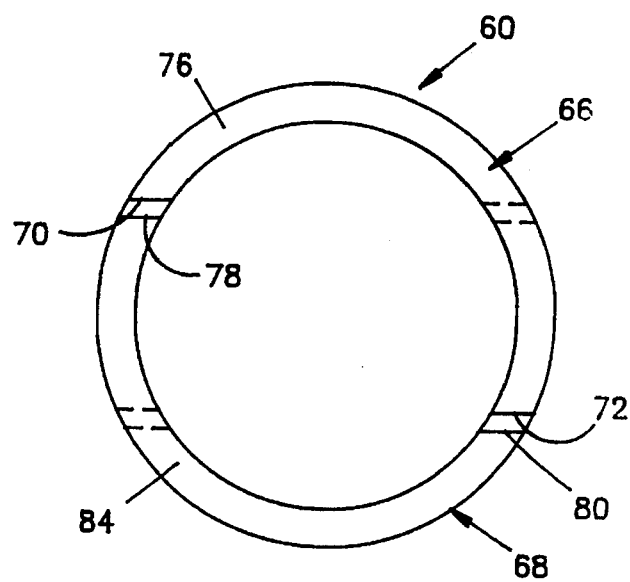
FIG. 6 is a plan view of the segmental ring of FIG. 5.

Wear rings 60 and sealing rings 62 are positioned in annular grooves provided around the outer surface of the system. As illustrated in FIGS. 5 and 6, wear ring 60 is comprised of two semi-circular pieces 66 and 68 having respective angled ends which are disposed in parallel relation when installed in the piston grooves. Section 66 includes ends 70 and 72 and parallel face surfaces 74 and 76. Section 68 includes angled ends 78 and 80 and parallel face surfaces 82 and 84.

Figure 7:
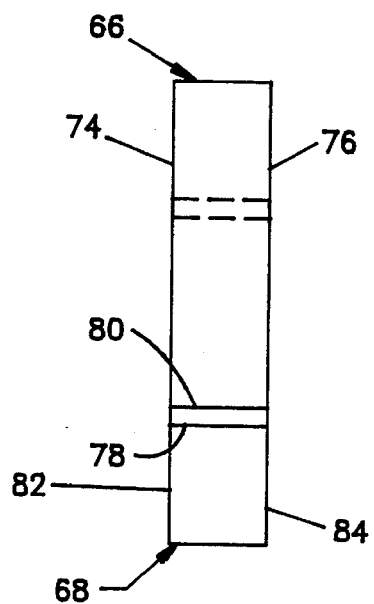
FIG. 7 is a side elevational view of another embodiment of a segmental wear ring as provided on the piston of the present invention.
Figure 8:
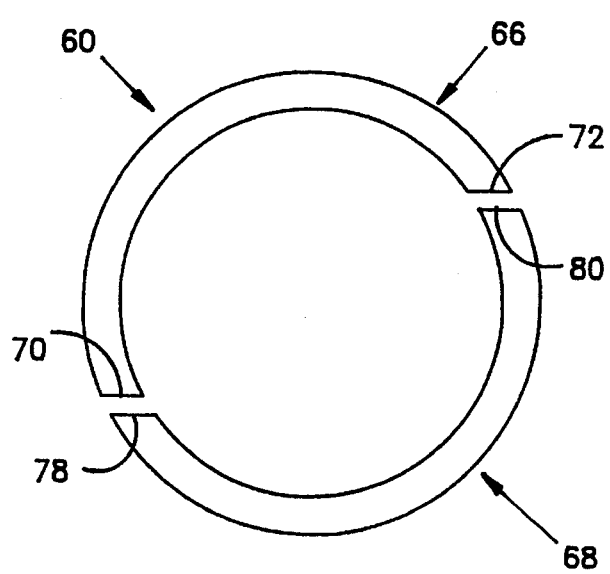
FIG. 8 is a plan view of the segmental ring of FIG. 7.

FIGS. 7 and 8 show an alternate embodiment of the wear ring of FIGS. 5 and 6 wherein like reference numerals refer to like parts. The wear ring of FIGS. 7 and 8 is similar to that disclosed in FIG. 5 and 6 except ends 70 and 72 of section 66 are disposed in normal relation to face surfaces 74 and 76. Likewise, ends 78 and 80 of section 68 are disposed in normal relation to face surfaces 82 and 84.

One specific example of the discrete materials used in making the lightweight piston/piston rod assembly of the present invention is to provide a piston rod body of aluminum and an outer shell member of steel (hardened, if desired). However, it is to be understood that other lightweight materials may be used for the rod body, and other harder, durable materials may be used for the outer shell member, including both metallic and non-metallic materials.

While the invention has been described with reference to the specific structure shown, it is to be understood that other modifications may be resorted to that are within the spirit and scope of the appended claims. For example, in the embodiments shown and described, only a single piston rod is used. However, if desired, the structure may include a piston rod or piston rods extending from each face surface of the piston through both end caps of the fluid actuator.

I claim:

1. A piston and piston rod assembly comprising:

a piston rod;

a discrete outer shell member carried on said piston rod, said outer shell member encompassing at least a portion of said piston rod;

a piston secured to said piston rod, said piston having first and second face surfaces, respectively, disposed on opposite sides thereof, said piston rod including first and second end portions, and said outer shell member provided with first and second ends;

said outer shell member and said piston rod being made of diverse materials to provide a piston rod which is lighter per volume of piston rod material than is a corresponding volume of the material of said outer shell, said outer shell having a hardness which is substantially equal to at least the hardness of said piston rod; and means for securing said outer shell member on said piston rod.

2. An assembly as set forth in claim 1 wherein said outer shell member is hardened to prevent excessive wear thereto.

3. An assembly as set forth in claim 2 wherein said outer shell member extends substantially along the length of said piston rod, and said second end of said outer shell member terminates adjacent to said second end portion of said piston rod, and said means for securing said outer shell member on said piston rod is a nut disposed on said second end portion of said rod in abutting relation with said second end of said outer shell member.

4. An assembly as set forth in claim 3 wherein said second end portion of said rod is provided with an annular shoulder, said nut disposed for abutting relation with said shoulder and said second end portion of said outer shell.

5. An assembly as set forth in claim 4 including sealing means disposed around the periphery of said piston, said sealing means being defined as at least one segmental ring.

6. A piston and piston rod assembly as in claim 1 wherein the density of the material of said piston rod is less than the density of the material of the outer shell.

7. A piston and piston rod assembly as in claim 1 wherein said first end of said shell is disposed in abutting relation against said first face of said piston.

8. A piston and piston rod assembly comprising:

a piston rod;

a discrete outer shell member removably carried on said piston rod, said outer shell member encompassing at least a portion of said piston rod;

a piston secured to said piston rod, said piston having first and second face surfaces, respectively, disposed on opposite sides thereof, said outer shell member covering a predetermined portion of said piston rod and provided with first and second ends, and said piston rod being provided with an annular recessed portion forming an annular shoulder on said rod a predetermined distance from said first face of said piston, said outer shell member being positioned in said annular recessed portion with said first end in abutting relation with said annular shoulder;

said outer shell member and said piston rod being made of diverse materials to provide a piston rod which is lighter per volume of piston rod material than is a corresponding volume of the material of said outer shell, said outer shell having a hardness which is substantially equal to at least the hardness of said piston rod; and means for securing said outer shell member on said piston rod.

9. An assembly as set forth in claim 8 wherein said second end of said outer shell member terminates adjacent to said second end portion of said rod, and said means for securing said shell on said piston rod is a nut disposed on said second end portion of said rod in abutting relation with said second end of said outer shell member.

10. An assembly as set forth in claim 9 including sealing means disposed around the periphery of said piston, said sealing means being defined as at least one segmental ring.

11. An assembly as set forth in claim 8 wherein said outer shell member is hardened to prevent excessive wear thereto.

12. A piston and piston rod assembly as in claim 8 wherein the density of the material of said piston rod is less than the density of the material of the outer shell.

13. A piston and piston rod assembly comprising:

a piston rod;

a discrete outer shell member removably carried on said piston rod, said outer shell member encompassing at least a portion of said piston rod;

a piston secured to said piston rod, said piston having first and second face surfaces, respectively, disposed on opposite sides thereof, said piston rod having first and second end portions, an intermediate portion, and a recessed annular portion forming an annular shoulder a predetermined distance from said first face of said piston, said outer shell member having first and second ends, said first end being disposed in abutting relation with said first face of said piston and said second end disposed in abutting relation with said annular shoulder;

said outer shell member and said piston rod being made of diverse materials to provide a piston rod which is lighter per volume of piston rod material than is a corresponding volume of the material of said outer shell, said outer shell member having a hardness which is substantially equal to at least the hardness of said piston rod; and means for securing said outer shell member on said piston rod.

14. An assembly as set forth in claim 13 wherein said outer shell member is hardened to prevent excessive wear thereto.

15. An assembly as set forth in claim 14 wherein said piston is disposed in removably secured relation on said first end portion of said piston rod whereby said outer shell member is secured on said piston rod responsive to the secured relation of said piston on said piston rod.

16. An assembly as set forth in claim 15 including sealing means disposed around the periphery of said piston, said sealing means being defined as at least one segmental ring.

17. A piston and piston rod assembly as in claim 13 wherein the density of the material of said piston rod is less than the density of the material of the outer shell.

* * * * *